April 7, 1959 W. VUTZ 2,880,562
OVERLOAD RELEASE MEANS FOR TRACTOR MOUNTED MOWERS
Filed Feb. 13, 1957 4 Sheets-Sheet 1

Inventor
WILHELM VUTZ
BY Joseph Allen Brown
Attorney

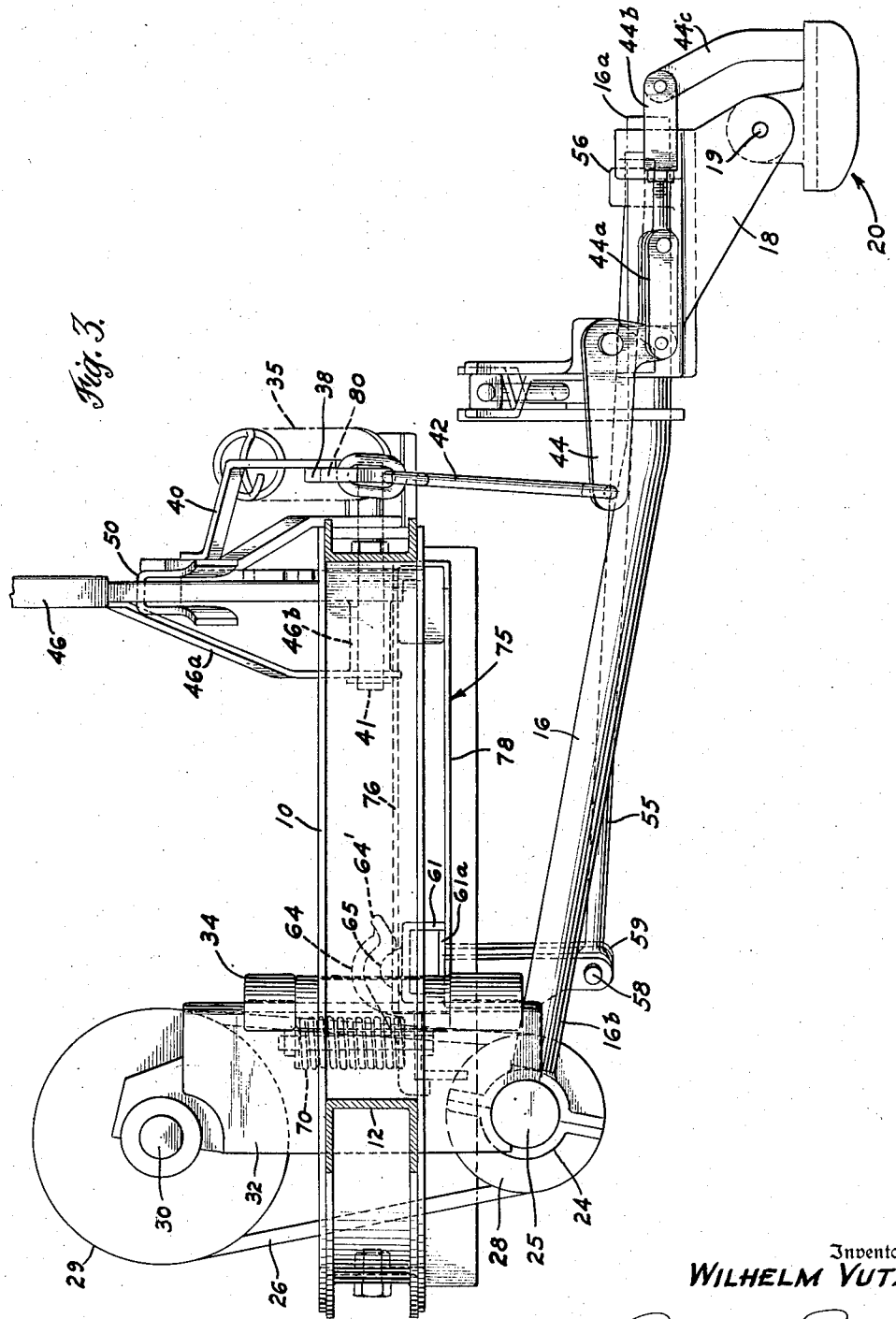

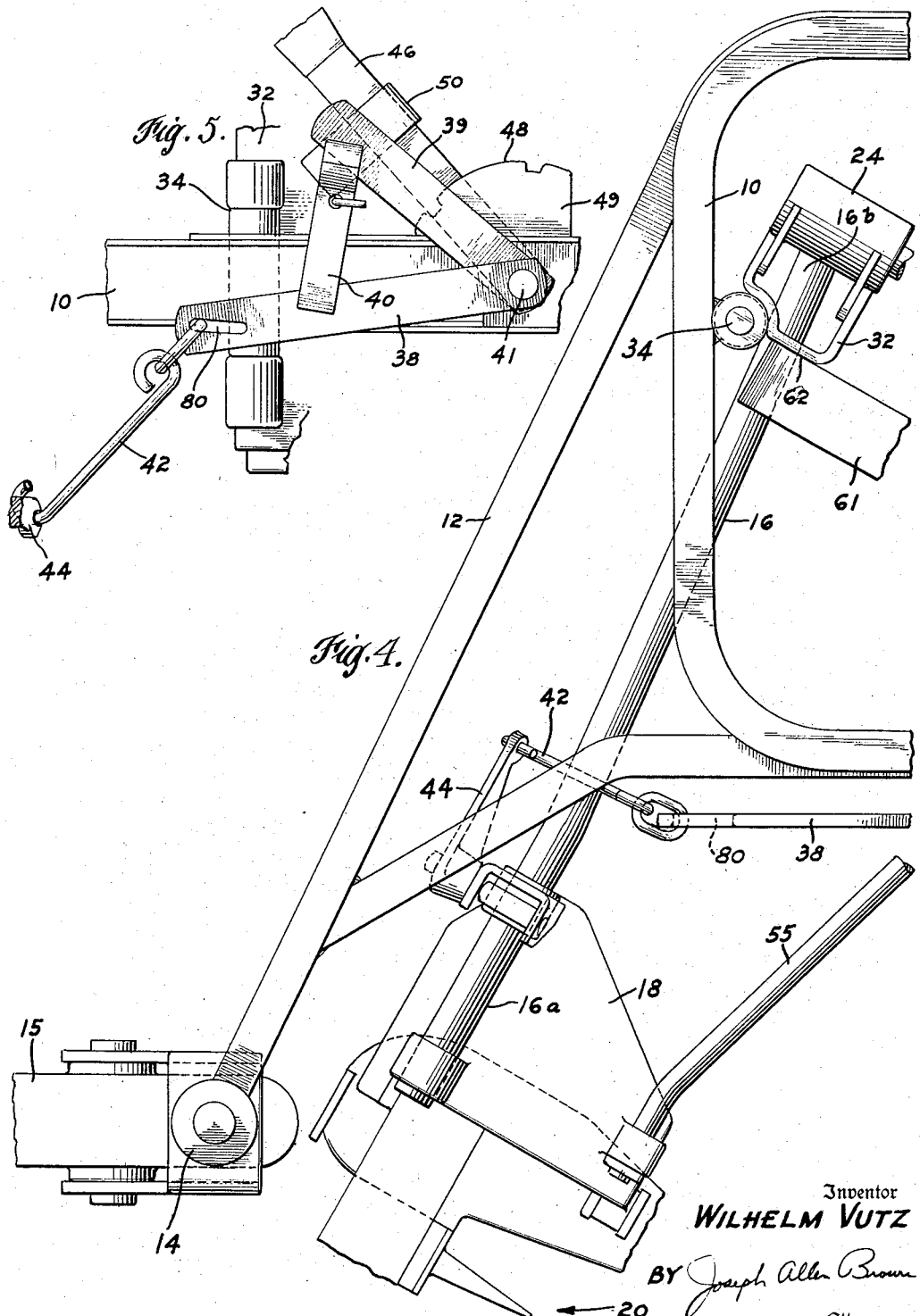

United States Patent Office 2,880,562
Patented Apr. 7, 1959

2,880,562

OVERLOAD RELEASE MEANS FOR TRACTOR MOUNTED MOWERS

Wilhelm Vutz, New Holland, Pa., assignor to Sperry Rand Corporation, New Holland, Pa., a corporation of Delaware Application February 13, 1957, Serial No. 639,957

7 Claims. (Cl. 56—25)

The present invention relates generally to mowers, and more particularly to mowers of the type having cutting means mounted for "break-away" action if an obstacle is encountered. Still more specifically, the invention relates to an improvement in the mower shown and described in Happe et al. U.S. Patent No. 2,786,319, issued March 26, 1957.

In the mower shown in the above patent, a problem is encountered in that the cutter bar suspension lacks sufficient torsional rigidity. The drag of the grass on the cutter bar, when the mower is moving forwardly, produces a turning moment on the sub-frame which supports the cutter bar. This turning moment tends to twist the cutter bar and sub-frame "under," that is, downwardly and clockwise if the cutter bar is viewed looking from its outer, free end. The turning moment is counteracted to some extent by the upward component of force provided by the pull rod or link between the cutter bar and the main frame of the mower. However, the pull rod is connected to the main frame by a releasable latch, and when the cutter bar hits an obstruction, the latch is released and the pull rod is freed of all tension. A consequence is that there is rapid wear around the joints of the vertical hinge pin about which the sub-frame and cutter bar swings. Moreover, the length of the hinge pin is such that stresses around the pin lead to rapid wear under the vibrations resulting from the reciprocation of the sickle of the cutting means. Another consequence of the inadequate compensation of the turning moment is that the tilt adjustment of the cutter bar is unstable and difficult to control.

Further, when the mower is "backed" after the cutter bar hits an obstacle, a counter-clockwise turning moment is directed against the cutter bar tending to twist it upwardly and producing the same undesirable wearing as results from the clockwise turning moment.

It is important that the various parts of the mower be properly oriented when the mower is in operation so that the cutter bar will be properly floatably supported for optimum operation. Also, it is desirable that the cutter bar have a considerable degree of rearward swing when an obstacle is engaged.

One of the principal objects of this invention is to provide a mower of the character described having cutter bar suspension means which has greater torsional rigidity than was heretofore available.

Another object of this invention is to provide this increased torsional rigidity through relatively simple, inexpensive means.

Another object of this invention is to provide means of the character described which resists both clockwise and counter-clockwise turning moments on the cutter bar and its supporting sub-frame.

Still another object of this invention is to provide a mower of the character described having a longer operating life than similar mowers of prior design.

A further object of this invention is to provide a mower of the character described having means which provides an increased amount of rearward swing of the cutter bar when a "break-away" action occurs.

Other objects of this invention will be apparent hereinafter from a specification and from the recital in the appended claims.

In the drawings:

Fig. 3 is a rear elevation of the mower;

Figure 1:
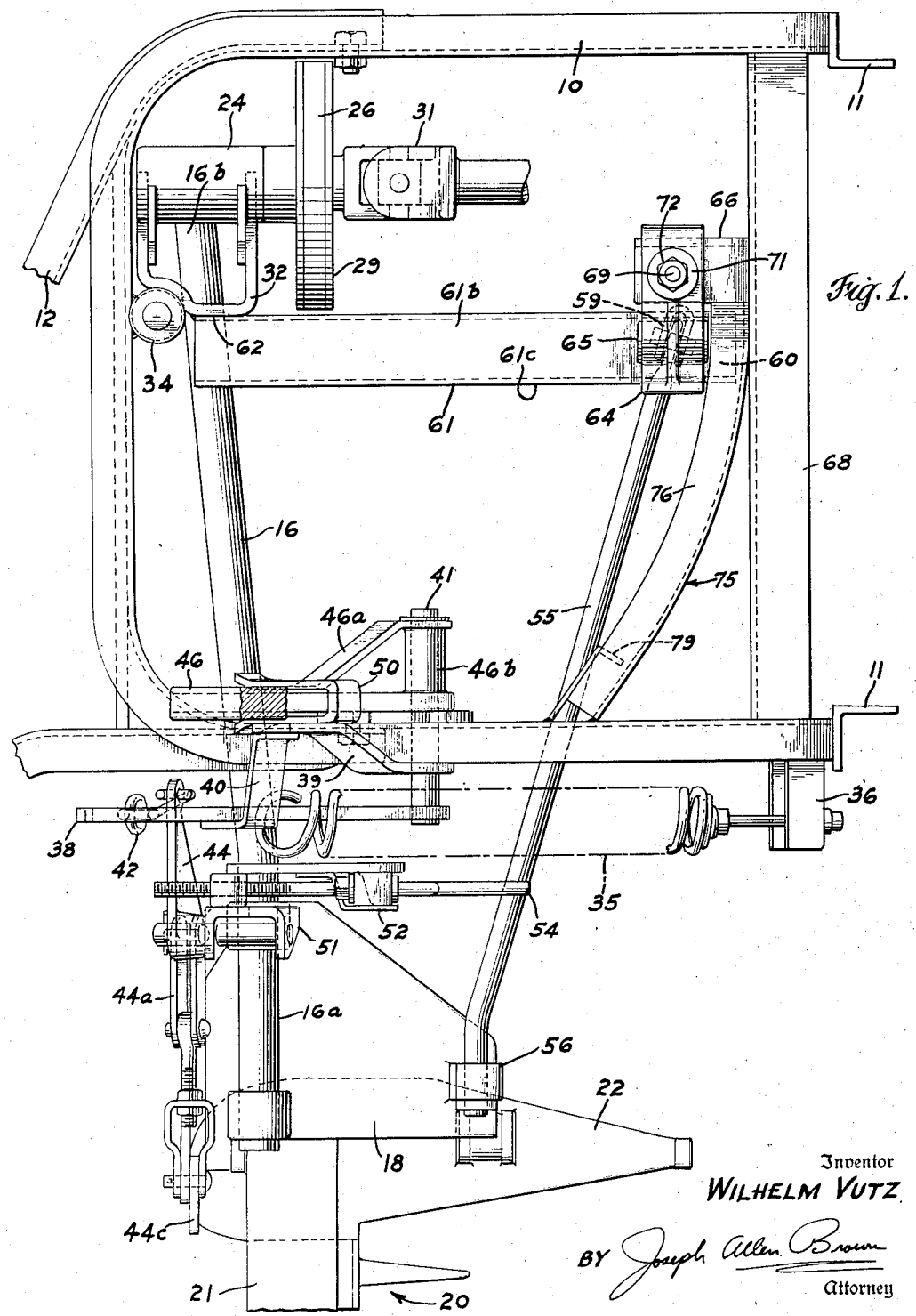
Fig. 1 is a fragmentary plan view of a mower incorporating the improved features of this invention, some of the parts of the mower structure being omitted and other parts being broken away and shown in section to more clearly illustrate applicant's improvements.

Fig. 4 is a fragmentary plan view similar to Fig. 1 showing the cutter bar swung rearwardly to a point proximate to the ground wheel which supports the rear of the mower frame; and, Fig. 5 illustrates the arm which supports the cutter bar and its direction of extension when the cutter bar is in "break-away" position, there being shown the means which provides increased rearward swing of the cutter bar.

Referring now to the drawings by numerals of reference, the mower comprises a main frame 10 supportable at its forward end by projecting tabs or ears 11 connectable to a prime mover, such as a tractor, not shown. Main frame 10 includes a triangular section 12 (Figs. 1 and 4) having swivel means 14 for a ground wheel 15 which supports the rear end of the frame.

Disposed beneath main frame 10 for swinging movement about a vertical axis is a sub-frame or push bar 16 which normally extends generally transversely relative to the direction in which the mower is adapted to travel. Sub-frame 16 has an outer end 16a on which a conventional yoke 18 is mounted. Yoke 18 pivotally supports at 19 the inner end of conventional reciprocable cutting means 20. The cutter bar 21 of such cutting means has a ground engageable shoe at each end, only the inner shoe 22 being shown.

Sub-frame 16 has an inner end 16b connected to a split bearing 24 which supports drive shaft 25. Shaft 25 is driven by the endless belt 26 which is trained around a drive shaft pulley 28 (Fig. 2) and a driven pulley 29. Pulley 29 is driven from the tractor through a conventional power-take-off drive including shaft 30 and universal power-take-off coupling 31. The drive from shaft 25 to the cutting means is not shown, such being a pitman drive of conventional structure and similar to that shown in the aforementioned patent.

Pulleys 28—29, bearing 24, and the inner end 16b of sub-frame 16 are supported on a housing 32 rotatable on a vertical hinge 34. When cutting means 20 encounters an obstacle, it "breaks away" or swings rearwardly about hinge 34 from the position shown in Fig. 1 to the position shown in Fig. 4, thus enabling the tractor operator to bring the tractor, and thus the mower, to a stop before serious damage results to the cutting means.

Sub-frame 16 is thus swingable in a horizontal plane about the vertical axis of hinge 34. It is likewise pivotal about the horizontal, longitudinal axis of drive shaft 25.

Cutting means 20, while carried on sub-frame 16, is floatably or resiliently supported by means of a spring 35 connected under tension between a bracket 36 on main frame 10 and a bell crank lever consisting of arms 38 and 39 and a cross or brace member 40. The bell crank lever is pivoted on the main frame on a pivot pin 41. The end of arm 38 remote from pin 41 has one end of a normally downwardly extending flexible link or tension element 42 connected to it. The other or lower end of the element 42 is connected through bell crank 44, link 44a, clevis 44b, and link 44c to yoke 18 and shoe 22.

Spring 35 exerts a pulling force on cross member 40 and an upward pull on arm 38, thereby floatably supporting the cutting means.

An adjusting lever 46 swingable about pivot pin 41 carries a detent, not shown, cooperative with the notched edge 48 of a quadrant plate 49 in a conventional manner. Plate 49 is affixed to main frame 10. Lever 46 is braced by a strut 46a also mounted on pivot pin 41 for swinging movement with the lever. A spacer 46b on the pivot pin laterally separates the base ends of members 46 and 46a. Lever arm 39 carries a U-shaped bracket 50 which straddles lever 46. When lever 46 is rotated clockwise from the position shown in Fig. 2, it operates through bracket 50, arm 39, cross member 40, arm 38, element 42, bell crank 44, link 44a, clevis 44b, and link 44c to raise cutting means 20. When the lever is rotated back to starting position, the cutting means lowers under its own weight.

The rotational position of cutting means 20 on sub-frame 16, through which the tilt or angle of attack of the cutter bar is determined, is regulated by means of levers 51, 52 and crank handle 54 operable in conventional fashion and not described in detail here since it plays no part in the present invention. In fact, all of the structure thus far described is essentially the same as that shown in the Happe et al. patent. The structure which constitutes applicant's improvement will now be described.

Sub-frame 16 and cutting means 20 are normally maintained in forward, operating position by means of a drag link or pull rod 55 connected at 56 to yoke 18 and at 58 to a clevis-like member 59. Member 59 depends from a point spaced inwardly from the free end 60 of a swing arm 61 affixed at 62 to housing 32. Swing arm 61 is normally held to extend in a direction generally parallel to the direction of travel of the mower by means of a latch 64 which overlies the arm and engages a cooperative latch element 65 welded or otherwise affixed to the top of the arm.

Latch 64 is carried on a bracket 66 affixed to a forward crossbar 68 of main frame 10. The latch is mounted on a bolt 69 for vertical movement relative to the top faces of arm 61 and bracket 66, being, however, biased downwardly by spring 70 held under compression by washer 71 engaged by nut 72 threaded on the bolt. Nut 72 is adapted to be threaded "down" until latch 64 exerts a desired latching effect.

The holding force of latch 64 is adapted to be such that under normal operating conditions swing arm 61 will be held against movement and pull rod 55 will hold the cutting means 20 in extended, operative position. However, when an unusual resistance or obstacle is encountered by cutting means 20, the resisting force will be transmitted through pull rod 55 to "release" latch 64 and free arm 61 for swinging movement.

When latch 64 is released, the upward component of force provided by pull rod 55 ceases. Thus, this force to resist twisting "under" of the cutting means is removed, and during a rearward swing of the cutting means there is a tendency for such cutting means to twist clockwise under the force of the obstacle encountered. When the operator backs the tractor to move the cutting means from engagement with the obstacle encountered, the "drag" on the mower tends to twist the cutter bar counter-clockwise. These clockwise and counterclockwise forces cause more rapid wear of the mower parts, particularly hinge 34, than is desirable.

To eliminate this twisting and to provide torsional rigidity, an arcuate guide track 75 is provided. Guide track 75 is U-shaped in cross-section, having upper and lower flanges or legs 76 and 78, respectively, between which the free end 60 of swing arm 61 extends. Flange 78 prevents downward movement of arm 61 as it swings when the cutting means "breaks" rearwardly, while flange 76 prevents upward movement of the arm when the mower is backed away from the obstacle. It will thus be readily apparent that the stresses, and thus wear, around hinge 34 will be greatly reduced.

Even when the mower is in normal operation, that is, with the cutting means 20 extending transversely, swing arm 61 performs a desirable function in that it provides a more solid support for pull rod 55 than was heretofore available. Thus, the tilt adjustment of the mower may be controlled more positively and hinge 34 is more stable against the vibration forces imparted to it from the reciprocation of the cutting means.

As best shown in Fig. 3, swing arm 61 is rectangular in cross-section, having a lower flat face 61a slidable on flange 78 of track 75, and an upper flat face 61b slidably engageable with flange 76 of the track. The vertical side face 61c of the swing arm which faces the cutting means is engageable with a stop 79 disposed within track 75. The position of stop 79 is such that cutting means 20 is brought to a halt in a rearward swinging movement before it engages ground wheel 15.

The position of stop 79 takes into account another feature of applicant's invention, namely, the employment of an elongate slot 80 in bell crank arm 38 instead of the usual hole heretofore provided.

Figure 2:
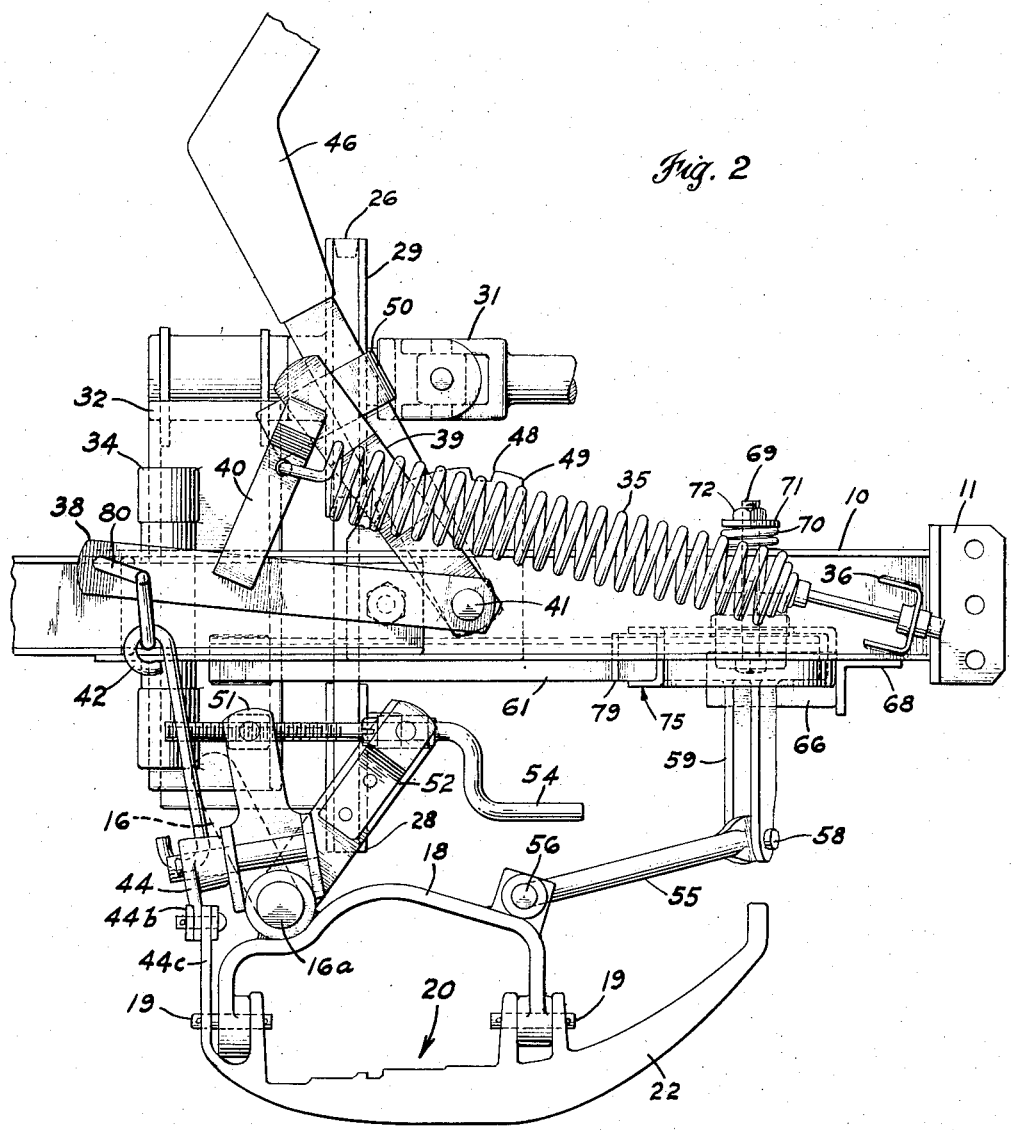
Fig. 2 is a side elevation of Fig. 1 looking from the bottom of Fig. 1, that is, from the cutter bar toward the mower frame.

As shown in Fig. 2, slot 80 is inclined downwardly in a forward direction relative to the movement of the mower when the mower is in normal operating position. Due to the incline of the slot, element 42 is maintained in the forward lower end of the slot, such position being necessary relative to the other parts of the mower suspension to obtain a proper floating action and optimum mower operation. However, when cutting means 20 strikes an obstacle, latch 64 lets go and the cutting means swings rearwardly producing a downward pull on arm 38. As the cutting means moves rearwardly, element 42 slides rearwardly in slot 80 to the position shown in Fig. 5. Slot 80, in effect, increases the effective length of element 42 thereby providing a greater degree of rearward movement of cutting means 20 when such means breaks away.

The position of stop 79 is such that the rearward swing of the cutter bar and sub-frame is stopped before arm 38 takes the load, thereby guarding the floating support means of the mower from damage.

After an obstacle has been engaged, latch 64 released, and cutting means 20 swung back, the operator may reset the mower merely by backing-up the tractor. As the tractor is backed, the sub-frame swings about hinge 34, causing swing arm 61 to move toward latch 64. As shown in Fig. 3, the latch has an up-turned nose 64, which the swing arm engages and cams upwardly, whereby the arm passes beneath the latch and snaps into locked position. At the same time, arm 38 returns to its normal position and due to the incline of slot 80, element 42 resumes its position in the forward end of slot 80.

With the structure just described, twisting of sub-frame 16 and cutting means 20 is restrained, the upper leg 76 of track 75 limiting upward or counter-clockwise movement and the lower flange or leg 78 resisting downward or clockwise movement. Slot 80, being inclined, keeps element 42 properly disposed during normal operation of the mower, yet provides means for increasing the effective length of the element when a "break-away" occurs, thereby enabling a greater swing of the mower. Stop 79 halts the rearward swing of the cutting means before ground wheel 15 is engaged, spring 35 providing a cushioning force during the swing as set forth in the Happe et al. patent.

While the invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described my invention, what I claim is:

1. A mower comprising reciprocable cutting means, a frame, means supporting said cutting means on said frame for swinging movement relative thereto, and guide means defining and restricting the swinging movements of said cutting means relative to said frame, said guide means comprising a guide track carried on said frame and a swing arm cooperative therewith, said swing arm having an end slidable on said track and an end opposite said one end fixed to said supporting means.

2. A mower as recited in claim 1 wherein said guide track has spaced parallel guide surfaces which restrict movement of said one end of said arm in two directions.

3. A mower as recited in claim 2 wherein said swing arm is rectangular in cross-section having opposed, parallel faces one of which is slidable on one of said guide surfaces and the other of which is slidable on the other of said guide surfaces.

4. A mower as recited in claim 1 wherein said cutting means is swingable about a vertical axis, said guide track being arcuate and concentric to said axis, said swing arm pivoting about said axis when said cutting means swings.

5. A mower comprising a main frame adapted for ground traversing movement, a sub-frame mounted on said main frame for swinging movement about a vertical axis, reciprocable cutting means carried on said sub-frame and swingable therewith, said sub-frame and cutting means normally extending laterally relative to said main frame and to the direction of movement of the mower, means connected between said main frame and said sub-frame for holding the sub-frame and cutting means in said laterally extending position, said holding means including a latch releasable upon engagement of said cutting means with an obstacle whereby the cutting means and said sub-frame may break away and swing about said vertical axis, and guide means between said main frame and said sub-frame for defining and restricting the swinging movements of said cutting means and sub-frame when a break-away action occurs, said guide means comprising a guide track mounted on said main frame, a swing arm, said swing arm having one end fixed to said sub-frame and swingable therewith and an end opposite said one end slidable on said guide track.

6. A mower as recited in claim 5 wherein said guide track extends in generally a horizontal plane and has spaced, parallel, horizontal guide surfaces one of which restricts downward movement of said swing arm and the other of which restricts upward movement, while permitting free lateral movement.

7. A mower as recited in claim 6 wherein a stop is provided in said guide track at a point spaced from said latch and engageable with said swing arm to thereby limit the range of movement of said swing arm and thus the swinging movement of said cutting means.

References Cited in the file of this patent

UNITED STATES PATENTS

| | | |
|---|---|---|
| 2,580,266 | Abgarian | Dec. 25, 1951 |
| 2,699,635 | Burton | Jan. 18, 1955 |
| 2,700,263 | Goss | Jan. 25, 1955 |
| 2,741,889 | Elfes | Apr. 17, 1956 |
| 2,757,504 | Elfes et al. | Aug. 7, 1956 |
| 2,796,713 | Richey | June 25, 1957 |
| 2,817,204 | Heinlein et al. | Dec. 24, 1957 |

FOREIGN PATENTS

| | | |
|---|---|---|
| 896,733 | Germany | Nov. 16, 1953 |
| 155,580 | Australia | Mar. 5, 1954 |